United States Patent [19]

Siryj

[11] 3,984,279

[45] Oct. 5, 1976

[54] LABELING APPARATUS

[75] Inventor: Bohdan Wolodymyr Siryj, Cinnaminson, N.J.

[73] Assignee: RCA Corporation, New York, N.Y.

[22] Filed: Feb. 24, 1975

[21] Appl. No.: 552,165

[52] U.S. Cl. .......... 156/556; 156/285; 156/DIG. 2; 156/DIG. 37

[51] Int. Cl.$^2$ .......... B31F 5/00; B29C 17/00

[58] Field of Search .......... 156/285, 556, 540–542, 156/584, DIG. 2, DIG. 37, DIG. 42

[56] References Cited

UNITED STATES PATENTS 3,236,715 2/1966 Gunderson .......... 156/285

*Primary Examiner*—Douglas J. Drummond
*Attorney, Agent, or Firm*—Edward J. Norton; Raymond E. Smiley

[57] ABSTRACT

Vacuum controlled apparatus for automatically applying a label to an item which may not lie desirably along a given plane. A label head consists of two separate elements forming a chamber to which a source of vacuum is connected. One of the elements contains openings extending between a label holding surface and the chamber. When the label head is moved to the item to be labeled, overtravel is provided, causing the two elements to separate, which reduces the vacuum and allows the element holding the label to align the label holding surface with the surface of the item to be labeled. Also disclosed is a device for enhancing the stripping of a label from a label carrier.

6 Claims, 7 Drawing Figures

LABELING APPARATUS

The invention herein described was made in the course of or under a contract with the United States Postal Service.

BACKGROUND OF THE INVENTION

In automatic label applying apparatus, it is known to apply a vacuum to a label head to hold a label for transfer from the label supply to the item to be labeled. Relatively complex mechanisms are utilized to sense that the label is against the item and to remove the vacuum. Additional problems arise when the item is at some angle relative to the label head, resulting in the label not being fully applied to the package.

Labels are usually supplied to the label applying apparatus by use of a low adhesion carrier. It is known in the prior art to pass the low adhesion carrier around a member having a small radius so that, as the carrier makes the turn, a label attached thereto will tend to follow a straight path and thus will be peeled off the carrier. The success of such a stripping device is related to the tension applied to the carrier: the greater the tension the greater the chance of successfully stripping a label. High tension, however, tends to cause a torn carrier and alignment problems of the carrier and thus the labels attached thereto.

SUMMARY OF THE INVENTION

Apparatus for applying a label to an item includes a label applying head, a plug in an opening in the head normally biased into a gastight fit in the opening, and means for applying a vacuum to the head. The head includes a hollow chamber, a label applying surface, orifice means coupling the surface to the chamber, and an additional opening in which the plug resides. Also included is a means for moving the head with the label to the item for applying mechanical pressure on the label to apply the same to the item. The plug is arranged to move out of the gastight position upon contact of the label with the item, the vacuum being thereby reduced to reduce the attraction of the label to the head.

According to an additional aspect of the invention, an improved label stripping apparatus is claimed, which includes a sharp radius member about which a label carrier supporting pressure sensitive labels is drawn, and a guide positioned opposite the member with just sufficient clearance to permit the labels and carrier to pass therebetween.

BRIEF DESCRIPTION OF THE DRAWING

FIGS. *5a* and *5b* are enlarged views of a portion of FIG. 1 illustrating with more detail label stripping apparatus without and with, respectively, a label stripping guide according to the invention.

DETAILED DESCRIPTION

Figure 1:
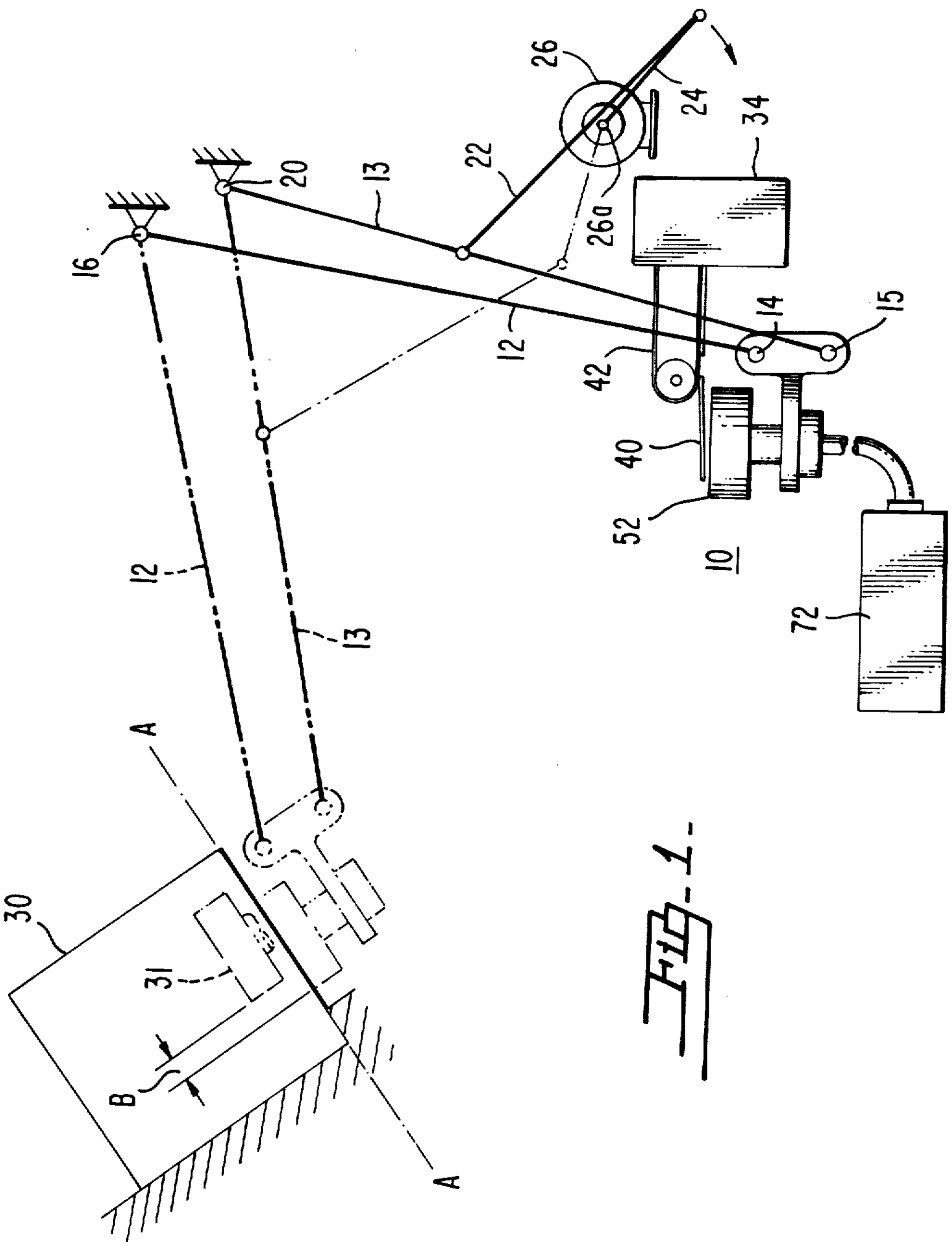
FIG. 1 is a label application device utilizing a novel application head and label stripper guide according to the present invention.

Referring to FIG. 1, label application head 10 is pivotally attached to one end of two transfer arms 12, 13 at pivot points 14 and 15. The other ends of transfer arms 12 and 13 are pivotally attached at 16, 20 to a frame (not shown) to which all of the various elements are directly or indirectly attached. A crank arm 22 is pivotally attached at one end to one of transfer arms 12, 13, attachment to arm 13 being shown, and pivotally attached at the other end to an arm 24. Arm 24 is attached to a rotational drive means such as a motor 26. Motor 26 is rotated on command to drive label head assembly 10 to the position shown by dashed lines, i.e., to an item to be labelled such as package 30, the undersurface of which lies desirably along plane A—A. In fact, crank arm 22 is arranged to drive the label head 10, in the absence of a package 30, beyond plane A—A to the position shown by double dashed line 31. The reason for such overtravel (which is shown somewhat exaggerated for illustrative purposes) will be explained later in the description.

A label delivery device 34, illustrated in block form, is arranged to deliver labels 40 to label head 10 when it is in the position illustrated by solid lines. A suitable label production and delivery device for this application is described in U.S. Pat. No. 3,757,349, issued Sept. 4, 1973, to Langdon Hollister Fulton and assigned to the assignee of the instant invention. Referring to FIGS. *5a* and *5b*, the labels 40 may have a pressure sensitive glue backing and may be attached to a low adhesive carrier 42, which is arranged to pass over a small radius member 44 in the direction indicated by arrow 43 for causing the labels to separate from the low adhesion carrier in the immeidate vicinity of label head 10 (FIG. 1). Label separation occurs because the label is relatively stiff and thus tends to follow a straight path rather than follow the curvature of member 44.

Figure 6:
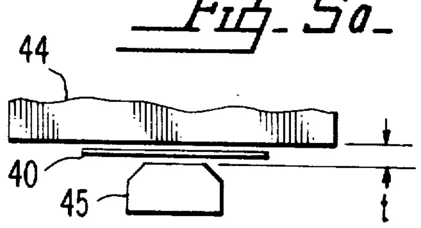
FIG. 6 is a view at right angles to that of FIGS. *5a* and *5b* with the label carrier removed.

It has been found that while the labels should separate from the carrier 42 as it passes over member 44, this is only accomplished in practice if large differential tension is applied to the carrier 42, which leads to tearing of the carrier, misalignment of the carrier, etc. As illustrated in FIG. *5a* to which attention is now directed, in the absence of great differential tension on carrier 42 (i.e. when $T_2$ not $>>$ $T_1$), carrier 42 tends to conform to member 44 leading to late stripping of labels such as a label 40 *a* (also shown in phantom) or incomplete stripping of labels such as label **40*b*** also shown in phantom. As illustrated in FIG. *5b*, it has been found that the stripping operation is improved by providing a label strip guide 45 having a surface parallel to and separated a distance *t*, from the sharp radius portion **44*a* of member 44,** where *t* is the sum of the label thickness, the carrier thickness and some slightly additional amount for clearance purposes, such as 0.008 centimeters, which forces the carrier to conform more closely to the sharp radius area **44*a* of member 44. With the addition of stripping guide 45, no unusual tension need be applied to wax carrier 42 to effect consistently good stripping of labels 40** from the carrier. FIG. 6 is a view normal to those of FIGS. *5a* and *5b* with carrier 42 removed.

Figure 2:
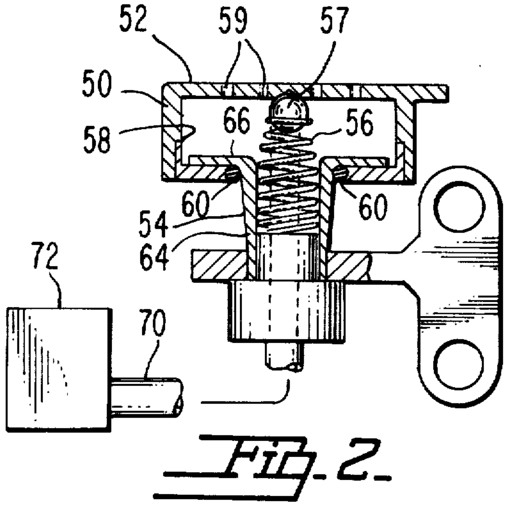
FIG. 2 is a cross-section of the label application head of FIG. 1 parallel to the view as illustrated therein.
Figure 3:
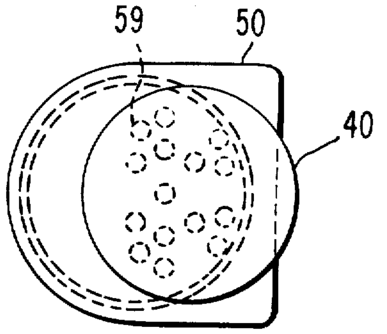
FIG. 3 is a top view of the label application head of FIG. 2 with a label in position to be applied to an item.

Label head assembly 10 is shown in crossection in FIG. 2. It consists basically of three parts, a first element 50 containing a label surface 52, a second element 54, a portion of which resides in element 50 acting therein as a plug, and a bias mechanism comprising a compression spring 56 and ball 57. Element 50 includes a hollowed out chamber surrounded by walls 58, a plurality of orifices 59 coupling the chamber to surface 52 (see FIG. 3, which is a top overview of surface 52 of element 50), and an additional opening surrounded by a gasket 60 in which element 54 resides.

Element 54 essentially comprises a tapered tube 64 having flange 66 on one end thereof, the latter residing in the chamber of element 50. The tubular end of element 54 is connected by a flexible tubing 70 to a source of vacuum 72. Bias spring 56 biases element 54 into a gastight relationship with element 50, the cooperation of flange 66 and gasket 60 providing the gastight seal. Thus, a label positioned over orifices 59 will be held in place by the relatively higher atmospheric pressure in the environment in which head 10 is situated.

When element 50 is pushed downward (as oriented in FIG. 2), against the force of bias spring 56 so that gasket 60 is opposite the tapered portion of tube 64, the gastight seal is broken. How this occurs will shortly be explained in connection with the description of operation of the device which hereafter follows.

Figure 5A:
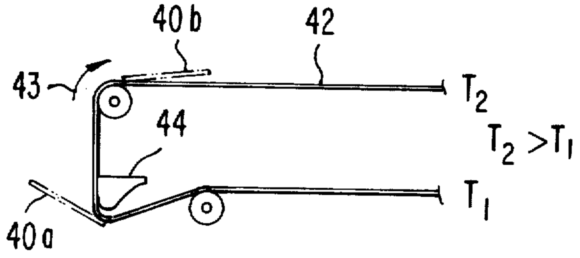
Figure 5B:
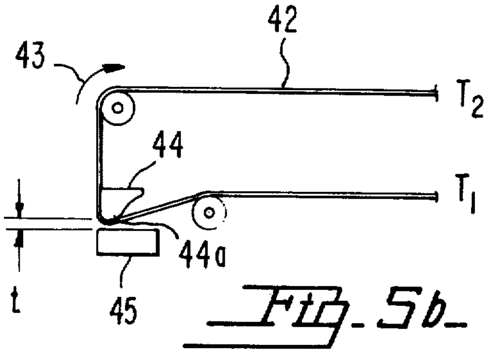

Referring again to FIG. 1, label delivery device 34 delivers a label 40 to label head 10 with the label oriented so that the pressure sensitive glue backing is at the top of the label. The label is held in place on surface 52 of head 10 by vacuum. Label stripping guide 45 (FIG. 5*b*) facilitates stripping of a label to insure that the label will be presented properly, positioned adjacent surface 52 of member 50. It should be noted that when head 10 is in the fully retracted position away from the item 30, arms 22 and 24 are in line with arm 22 being over the shaft 26*a* of motor 26. For illustrative purposes, they are shown slightly separated in less than the fully retracted position. Then motor 26 is operated to move label assembly 10 toward plane A—A.

Figure 4:
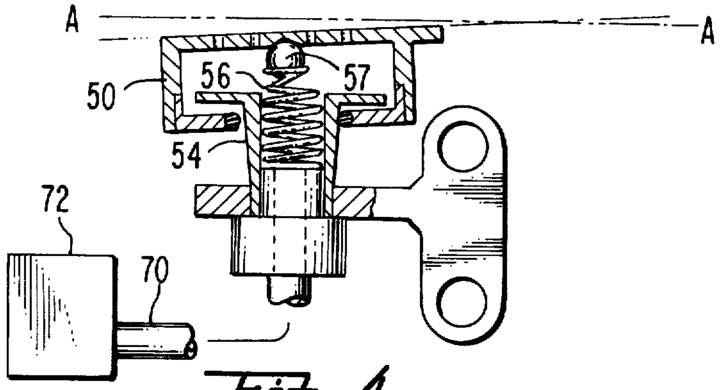
FIG. 4 is a cross-section of the label application head of FIG. 2 illustrating its label application position.

When surface 52 reaches plane A—A, the head assembly is still traveling so that pressure is directed to the bottom of backage 30 lying along A—A. The bias force provided by spring 56 (FIG. 2) is sufficiently light so that as the travel of element 54 (FIG. 2) continues, surface 52 remains along plane A—A, causing flange 66 to be forced into the chamber in element 50 (FIG. 2). Since flange 66 is no longer in contact with gasket 60, the gastight seal is broken admitting air into the chamber. As a result, label 40 is no longer attracted to surface 52, and is free to be attached to item 30. Because of the placement of pivot points 16 and 20, arms 12, 13 are at an angle relative to plane A—A when surface 52 contacts the item. Therefore, continued travel of element 54 results in a component of motion along the item a distance B as overtravel occurs. Motion along the item causes the label with its gummed backing to be "ironed" onto the package. As illustrated in FIG. 4, if the surface of the package to be labeled does not lie completely in plane A—A, element 50 pivots about ball 57, presenting entire surface 52 to item 30. This feature is important, since otherwise the label may not become properly attached to item 30 and may subsequently and undesirably fall off.

What is claimed is:

1. Apparatus for applying a label to an item surface comprising in combination:

a label applying head including: a hollow chamber, a label applying surface, orifice means coupling said surface to said chamber, and an additional opening;

plug means comprising one portion forming a gastight fit with said additional opening and another portion forming a non-gastight fit with said additional opening, positioned in said additional opening normally biased into a gastight fit therein;

means coupling a source of vacuum to said head whereby when said plug means is biased into said gastight fit, a label on said head surface will be held in place by said vacuum; and means coupled to said plug means for moving the same and for thereby moving said head with said label on said surface to said item for applying mechanical pressure on said label to apply the same to said item, said plug means being arranged to automatically move to said non-gastight position upon the contact of said label with said item to reduce said vacuum and thus reduce the attraction of said label to said head.

2. The combination as set forth in claim 1 further including means for causing overtravel of said plug beyond the distance required for contact between said label and said item, said plug thereby occupying said non-gastight position.

3. The combination as set forth in claim 2, wherein said moving means is arranged to move said label applying head along said item as said overtravel is occurring.

4. The combination as set forth in claim 3 wherein aid item surface may be at an angle relative to a given plane wherein said label head includes means permitting it to tilt relative to said plug, when in said non-gastight position, to be parallel to and in contact with said item surface.

5. Labeling apparatus for applying a label to a surface of an item which surface desirably lies along a given plane, but which may lie at some angle relative to said given plane comprising in combination:

a first element including: a surface on which said label may be placed for application to said item surface, a hollow chamber, orifice means coupling said chamber to said surface, and an additional opening to said chamber;

a second element located in said additional opening having one portion which is a gastight fit in said additional opening and having another portion which is not a gastight fit;

bias means interposed between said first and second elements for biasing said second element into said gastight position in said first element and for permitting said first element to pivot about said second element when in the non-gastight relationship;

means coupling said chamber to a source of vacuum; and means coupled to said second element for moving said first and said second elements and said bias means with a label on the surface of said first element covering said orifice means whereby said vacuum maintains said label in place, toward said plane and arranged to overtravel so that said first element constrained by said item moves relative to said second element causing said second element to occupy said non-gastight position, said first element surface thereby being arranged to contact said item surface irrespective of any tilt thereof whereby gas enters said chamber reducing said vacuum therein, said label being thereby free to be attached to said item surface.

6. The combination as set forth in claim 5, wherein said moving means is arranged to move said label applying head along said item as said overtravel is occurring.

* * * * *